United States Patent
Apostolo et al.

(10) Patent No.: US 6,844,036 B2
(45) Date of Patent: Jan. 18, 2005

(54) FLUOROELASTOMERIC COMPOSITIONS

(75) Inventors: Marco Apostolo, Novara (IT);
Margherita Albano, Milan (IT);
Stefano Arrigoni, Novara (IT)

(73) Assignee: Ausimont S.p.A., Milan (IT)

( * ) Notice: Subject to any disclaimer, the term of this patent is extended or adjusted under 35 U.S.C. 154(b) by 63 days.

(21) Appl. No.: 10/151,886

(22) Filed: May 22, 2002

(65) Prior Publication Data

US 2003/0004273 A1 Jan. 2, 2003

(30) Foreign Application Priority Data

May 22, 2001 (IT) ..................................... MI2001A1062

(51) Int. Cl.$^7$ ............................ B29D 23/00; F16L 1/08; C08F 216/12

(52) U.S. Cl. ...................... 428/35.7; 526/242; 526/247; 526/249; 526/252; 526/255; 525/199; 525/231; 525/232; 525/326.2; 428/221; 428/304.4

(58) Field of Search ................................ 526/242, 247, 526/249, 252, 255; 525/199, 231, 232, 326.2; 428/35.7, 221, 304.4

(56) References Cited

U.S. PATENT DOCUMENTS

| | | |
|---|---|---|
| 3,752,787 A | 8/1973 | De Brunner |
| 3,876,654 A | 4/1975 | Pattison .................... 260/30.4 |
| 4,035,565 A | 7/1977 | Apotheker et al. ......... 526/249 |
| 4,233,427 A | 11/1980 | Bargain et al. ............. 525/478 |
| 4,243,770 A | 1/1981 | Tatemoto et al. ........... 525/331 |
| 4,259,463 A | 3/1981 | Moggi et al. ............... 525/331 |
| 4,281,092 A | 7/1981 | Breazeale .................. 526/247 |
| 4,564,662 A | 1/1986 | Albin ........................ 526/247 |
| 4,694,045 A | 9/1987 | Moore ....................... 525/276 |
| 4,745,165 A | 5/1988 | Arcella et al. .............. 526/247 |
| 4,789,717 A | 12/1988 | Giannetti et al. ........... 526/209 |
| 4,864,006 A | 9/1989 | Giannetti et al. ........... 526/209 |
| 4,904,726 A | 2/1990 | Morgan et al. |
| 4,943,622 A | 7/1990 | Naraki et al. ............... 526/206 |
| 5,173,553 A | 12/1992 | Albano et al. .............. 526/238 |
| 5,447,993 A | 9/1995 | Logothetis .................. 525/273 |
| 5,523,346 A | 6/1996 | Wu ............................ 524/805 |
| 5,616,648 A | 4/1997 | Wu ............................ 524/805 |
| 5,789,489 A | 8/1998 | Coughlin et al. ........... 525/370 |

FOREIGN PATENT DOCUMENTS

| | | |
|---|---|---|
| EP | 0 120 462 A1 | 10/1984 |
| EP | 0 127 407 A2 | 12/1984 |
| EP | 0 136 496 A2 | 4/1985 |
| EP | 0 182 299 A2 | 5/1986 |
| EP | 0 199 138 A2 | 10/1986 |
| EP | 0 335 705 A1 | 10/1989 |
| EP | 0 410 351 A1 | 1/1991 |
| EP | 0 684 277 A1 | 11/1995 |
| EP | 0 769 520 A1 | 4/1997 |
| EP | 0 708 797 B1 | 2/1998 |
| EP | 0 860 436 A1 | 8/1998 |
| EP | 0 969 027 A1 | 1/2000 |
| EP | 0 979 832 A1 | 2/2000 |
| EP | 1 031 606 A1 | 8/2000 |
| EP | 1 031 607 A1 | 8/2000 |
| WO | WO 95/02634 | 1/1995 |
| WO | WO 97/05122 | 2/1997 |

*Primary Examiner*—Samuel A. Acquah
(74) *Attorney, Agent, or Firm*—Arent Fox PLLC

(57) ABSTRACT

Fluoroelastomeric compositions comprising:

A) a fluoroelastomeric matrix;
B) a semi-crystalline fluoropolymer, in an amount from higher than 40% to 90% by weight based on the total of A)+B);

the fluoroelastomer A) incorporates the fluoropolymer B), the fluoropolymer B) being formed by tetrafluoroethylene (TFE) homopolymers, or by TFE by copolymers with one or more monomers containing at least one unsaturation of ethylene type, the average sizes of the semi-crystalline fluoropolymer particles being from 10 to 100 nm, preferably from 10 to 60 nm.

18 Claims, No Drawings

FLUOROELASTOMERIC COMPOSITIONS

The present invention relates to fluoroelastomeric compositions consisting essentially of a fluoroelastomer and of a semi-crystalline fluoropolymer, having improved chemical and thermal resistance, high hardness and lower fluid permeability, in particular hydrocarbons, combined with good mechanical properties and elongation higher than 200%, said compositions usable in the preparation of sealing manufactured articles, for example gaskets or pipes, in particular for the oil industry, said manufactured articles having surfaces roughnesses free.

Specifically, the present invention relates to fluoroelastomeric compositions comprising a fluoroelastomeric matrix which incorporates semi-crystalline fluoropolymer particles, said compositions characterized by improved mechanical properties combined with high hardness and improved surface aspect, roughness free. Said combination of properties makes available fluoroelastomers usable in the oil drilling field, wherein the fluoroelastomer manufactured articles must resist to high pressure variations and have good sealing properties. As manufactured articles, pipes, fittings, shaft seals (oil seal rings), gaskets can be mentioned.

It is known that to increase the fluoroelastomer hardness in the oil drilling field, high amounts of filler, such as carbon black, in an amount of the order of 40–60 phr, are to be added. In this way higher hardnesses are obtained, but the mechanical properties, in particular the elongation at break decreases to values of 100%, whereby the so obtained manufactured article loses its elastomeric properties and therefore it is more easily lacerable.

By trying to replace the carbon black filler with a semi-crystalline fluoropolymer, for example polytetrafluoroethylene (PTFE) powder, there are many difficulties in its incorporation already at amounts of about 25% by weight of semi-crystalline fluoropolymer. At any rate it is not possible to prepare an homogeneous blend between the semi-crystalline fluoropolymer and fluoroelastomer. Furthermore the manufactured articles have no suitable hardnesses for applications in oil industry. Generally, to obtain a satisfactory homogeneization of the semi-crystalline fluoropolymer in the fluoroelastomer, it is necessary to use complicated technologies, using open mixers with complicated incorporation cycles, for example by heating rolls and using several steps. Even operating with these extremely complicated technologies, the incorporation of the semi-crystalline fluoropolymer in the fluoroelastomer is not uniform and the manufactured article shows poor mechanical properties (in particular the modulus/elongation ratio) and poor reproducibility of the results, whereby the preparation process has poor reliability and there is a high number of pieces to be discarded. Besides, the final manufactured article is not homogeneous due to the poor dispersibility of the semi-crystalline fluoropolymer and therefore the hardness, even though it has an average value suitable to said applications, changes from point to point whereby the properties of the finished manufactured article are poor as above indicated and are not suitable for the use in the oil field, in particular in the oil drilling. Besides the sealing properties are poor.

It is known to incorporate under the latex form a semi-crystalline fluoropolymer in a fluoroelastomer to improve the mechanical properties with respect to a fluoroelastomer filled with PTFE powder. The particles of the semi-crystalline fluoropolymer latex have sizes comprised between 10 and 100 nm. A latex of a semi-crystalline fluoropolymer is used in an amount lower than 40% by weight. Said compositions are not suitable for the oil drilling applications, both for the hardness values and for the mechanical and sealing properties. See the European patent application 1,031,607. In said patent application the fluoroelastomer is used in high excess with respect to the semi-crystalline fluoropolymer. In the Examples amounts of the fluoropolymer between 15–20% are used. It has been shown that with said amounts, surface roughnesses free are obtained. No examples with amounts higher than 20% are given. Therefore from said description one could not predict the surface aspect and the homogeneity of the properties (in particular mechanical, hardness and sealing properties) of the manufactured article increasing the semi-crystalline fluoropolymer amount to values higher than 20%. The filler amount of 15–20% corresponds indeed to the amount of carbon black normally used in fluoroelastomers.

The skilled man in the art was not able therefore to expect that by increasing the amount of the semi-crystalline fluoropolymers to values higher than 20%, manufactured articles could be obtained, roughnesses free, easily able with the conventional transformation technology of fluoroelastomers (for example open mixers), and with the excellent combination and homogeneity of properties required by the oil industry, for example for the oil drilling.

In fact an essential aspect to obtain said properties is that the semi-crystalline fluoropolymer when used in amounts higher than 40% is capable to disperse in the fluoroelastomer without formation of aggregates and therefore maintaining the original size of the semi-crystalline fluoropolymer. The formation of said aggregates is a significant factor for the unhomogeneity and roughness.

The need was felt to have available fluoroelastomeric compositions having the following combination of properties:

improved mechanical properties, in particular improved elastic modulus/elongation at break ratio;

elongation at break higher than 200%;

high hardness, homogeneous on the whole manufactured article and suitable for oil drilling applications;

improved chemical and thermal resistance;

excellent surface aspect, roughnesses free;

working easiness in equipments conventionally used in the fluoroelastomer field, without using complicated technologies for incorporation of fluoropolymer.

It would be desirable to have also said fluoroelastomeric compositions showing a lower permeability to fluids, in particular to hydrocarbons.

The Applicant has unexpectedly and surprisingly found that it is possible to obtain the combination of the above properties by using the specific compositions defined hereunder.

An object of the present invention are therefore fluoroelastomeric compositions comprising:

A) a fluoroelastomeric matrix;

B) a semi-crystalline fluoropolymer, in an amount from higher than 40% to 90% by weight based on the total of A)+B);

the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, in an amount from 0.01% to 10% by moles, preferably from 0.05% to 7% by moles, the average sizes of the semi-crystalline fluoropolymer particles being from 10 to 100 nm, preferably from 10 to 60 nm.

The fluoroelastomeric compositions of the invention are obtainable by mixing the latex of the semi-crystalline fluororopolymer B) with the latex of the fluoroelastomer A) and subsequent coagulation.

Alternatively to the latex mixing, the fluoroelastomeric compositions of the invention can be obtained in the same reactor, using two subsequent steps: in the first step the semi-crystalline fluoropolymer B) having the above nanometric sizes is polymerized, while in the second step the fluoroelastomer A) is polymerized. By operating in this way the fluoroelastomer A) covers the latex particles of the semi-crystalline fluoropolymer B) allowing to obtain a very good disperdibility of the latter in the fluoroelastomer.

The semi-crystalline fluoropolymer B) amount incorporated in the fluoroelastomeric matrix is higher than 40% by weight, preferably from >40% to 80% by weight based on the total of the polymer mixture, more preferably from 45 to 70% by weight.

The semi-crystalline fluoropolymer B) particles having the above nanometric sizes are obtainable for example by polymerization in aqueous microemulsion of perfluoropolyoxyalkylenes as described for example in the European patent application 969,027 in the name of the Applicant, herein incorporated by reference. Polymerization techniques in microemulsion wherein the oil phase is formed by polymerizable unsaturated monomers can also be used, as described in U.S. Pat. No. 5,523,346 and U.S. Pat. No. 5,616,648.

The Applicant has found that in order to obtain the results of the invention it is essential that the semi-crystalline fluoropolymer B) has the mentioned nanometric sizes, while the size of the fluoroelastomer A) particles to be mixed with the fluoropolymer is not critical.

It has been unexpectedly found by the Applicant, see the comparative Examples, that the combination of properties of the invention compositions is obtainable only if the semi-crystalline fluoropolymer B) is present in amounts higher than 40% by weight with respect to the composition A)+B).

By semi-crystalline fluoropolymer, a fluoropolymer is meant, which shows, besides the glass transition temperature Tg, at least one melting temperature.

The preparation of the fluoroelastomers A) of the composition of the present invention can be carried out by copolymerization of the monomers in aqueous emulsion, according to known methods of the prior art, in the presence of radical initiators, for example, alkaline or ammonium persulphates, perphosphates, perborates or percarbonates, optionally in combination with ferrous, cuprous or silver salts, or of other easily oxidizable metals. In the reaction medium also surfactants of various types are usually present, among which fluorinated surfactants are particularly preferred. The polymerization reaction is generally carried out at temperatures in the range 25°–150° C., under a pressure up to 10 MPa. The preparation of the fluoroelastomeric matrix is preferably carried out in microemulsion of (per)fluoropolyoxyalkylenes, according to U.S. Pat. No. 4,789,717 and U.S. Pat. No. 4,864,006.

When the semi-crystalline fluoropolymer B) present in the fluoroelastomeric compositions of the invention is based on modified PTFE, i.e. it contains at least one comonomer, for its preparation comonomers having an ethylene unsaturation both of hydrogenated and fluorinated type can be used. Among the hydrogenated ones, ethylene, propylene, acrylic monomers, for example methylmethacrylate, (meth)acrylic acid, butylacrylate, hydroxyethylhexylacrylate, styrene monomers can be mentioned.

Among the fluorinated comonomers it can be mentioned:
$C_3$–$C_8$ perfluoroolefins, such as hexafluoropropene (HFP), hexafluoroisobutene;

$C_2$–$C_8$ hydrogenated fluoroolefins, such as vinyl fluoride (VF), vinylidene fluoride (VDF), trifluoroethylene, perfluoroalkylethylene $CH_2=CH$—$R_f$, wherein $R_f$ is a $C_1$–$C_6$ perfluoroalkyl;

$C_2$–$C_8$ chloro-fluorolefins, such as chlorotrifluoroethylene (CTFE);

(per)fluoroalkylvinylethers (PAVE) $CF_2=CFOR_f$, wherein $R_f$ is a $C_1$–$C_6$ (per)fluoroalkyl, for example $CF_3$, $C_2F_5$, $C_3F_7$;

(per)fluoro-oxyalkylvinylethers $CF_2=CFOX$, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl; fluorodioxoles, preferably perfluorodioxoles;

fluorovinylethers of general formula $CFX_{AI}=CX_{AI}OCF_2OR_{AI}$ (A–I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following:

H, Cl, Br, I; $X_{AI}=F$, H; the compounds of general formula $CFX_{AI}=CX_{AI}OCF_2OCF_2CF_2Y_{AI}$ (A–II) wherein $Y_{AI}=F$, $OCF_3$; $X_{AI}$ as aboved are preferred; in particular $CF_2=CFOC$—$F_2OCF_2CF_3$ (A–III) and $CF_2=CFOCF_2OCF_2CF_2OCF_3$ (A–IV) are preferred.

PAVES, in particular perfluoromethyl-, ethyl-, propylvinylether, MOVEs, in particular MOVE I and MOVE II, and fluorodioxoles, preferably perfluorodioxoles, are preferred comonomers.

The fluoroelastomers A) used in the present invention are VDF- or TFE-based copolymers and are for example selected from the following:

(1) VDF-based copolymers, wherein VDF is copolymerized with at least one comonomer selected from the following: $C_2$–$C_8$ perfluoroolefins, such as tetrafluoroethylene (TFE), hexafluoropropene (HFP); $C_2$–$C_8$ chloro- and/or bromo- and/or iodo-fluoroolefins, such as chlorotrifluoroethylene (CTFE) and bromotrifluoroethylene; (per)fluoroalkylvinylethers (PAVE) $CF_2=CFOR_f$, wherein $R_f$ is a $C_1$–$C_6$ (per)fluoroalkyl, for example trifluoromethyl, bromodifluoromethyl, pentafluoropropyl; perfluoro-oxyalkylvinylethers $CF_2=CFOX$, wherein X is a $C_1$–$C_{12}$ perfluorooxyalkyl, having one or more ether groups, for example perfluoro-2-propoxy-propyl; fluorovinylethers (MOVE) of general formula $CFX_{AI}=CX_{AI}OCF_2OR_{AI}$ (A–I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}=F$, H; the compounds of general formula: $CFX_{AI}=CX_{AI}OCF_2OCF_2CF_2Y_{AI}$ (A–II) wherein $Y_{AI}=F$, $OCF_3$; $X_{AI}$ as above, are preferred; in particular (MOVE I) $CF_2=CFOCF_2OCF_2CF_3$ (A–III) and (MOVE II) $CF_2=CFOCF_2OCF_2CF_2OCF_3$ (A–IV) are preferred; $C_2$–$C_8$ non fluorinated olefins (Ol), for example ethylene and propylene;

(2) TFE-based copolymers, wherein TFE is copolymerized with at least one comonomer selected from the following: (per)fluoroalkylvinylethers (PAVE) $CF_2=CFOR_f$, wherein $R_f$ is as above; perfluorooxyalkylvinylethers $CF_2=CFOX$, wherein X is as above; fluorovinylethers (MOVE) of formula $CFX_{AI}=CX_{AI}OCF_2OR_{AI}$ (A–I) wherein $R_{AI}$ and $X_{AI}$ are as above; $C_2-C_8$ fluoroolefins containing hydrogen and/or chlorine and/or bromine and/or iodine atoms; $C_2-C_8$ non fluorinated olefins (Ol); perfluorovinylethers containing hydrocyanic groups as described in U.S. Pat. No. 4,281,092, U.S. Pat. No. 5,447,993, U.S. Pat. No. 5,789,489.

Preferred compositions, in % by moles, of the monomers which form the basic structure of the fluoroela-stomer, are the following, being 100% the sum of the molar percentages of the monomers:

(a) vinylidene fluoride (VDF) 45–85%, hexafluoropropene (HFP) 15–45%, tetrafluoroethylene (TFE) 0–30%; $C_2-C_8$ non fluorinated olefins (Ol) 0–30%;

(b) vinylidene fluoride (VDF) 45–85%, perfluoroalkylvinylether (PAVE) and/or fluorovinylethers (MOVE) 15–55%, tetrafluoroethylene (TFE) 0–30%;

(c) vinilydene fluoride (VDF) 15–40%, $C_2-C_8$ non fluorinated olefins (Ol) 5–30%, hexafluoropropene (HFP) and/or perfluoroalkylvinylether (PAVE) 15–30%, tetrafluoroethylene (TFE) 10–30%;

(d) vinylidene fluoride (VDF) 5–30%, perfluoroalkylvinylether (PAVE) and/or fluorovinylethers (MOVE) 15–55%, tetrafluoroethylene (TFE) 33–75%;

(e) tetrafluoroethylene (TFE) 50–80% perfluoroalkylvinylether (PAVE) and/or fluorovinylethers (MOVE) 15–55%;

(f) tetrafluoroethylene (TFE) 45–65%, $C_2-C_8$ non fluorinated olefins (Ol) 20–55%, vinylidene fluoride 0–30%;

(g) tetrafluoroethylene (TFE) 32–60% by moles, $C_2-C_8$ non fluorinated olefins (Ol) 10–40% perfluoroalkylvinylether(PAVE) 20–40%.

Optionally the fluoroelastomeric matrix comprises also monomeric units deriving from a bis-olefin having general formula:

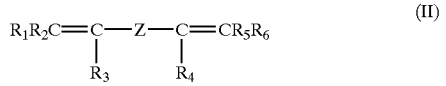

(II)

wherein:

$R_1$, $R_2$, $R_3$, $R_4$, $R_5$, $R_6$, equal to or different from each other, are H or $C_1-C_5$ alkyls;

Z is a $C_1-C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

The amount of units in the polymer chain deriving from said bis-olefins is generally in the range 0.01–1.0% by moles, preferably 0.03–0.5% by moles, still more preferably 0.05–0.2% by moles per 100 moles of the other above mentioned monomeric units which form the basic structure of the fluoroelastomer.

The compositions of the present invention can be cured by peroxidic or ionic route or by the combination of the two techniques. For crosslinking by peroxidic or mixed route, the fluoroelastomers A) contain in the polymer chain and/or in terminal position of the macromolecules iodine and/or bromine atoms. The introduction in the fluoroelastomeric matrix of said iodine and/or bromine atoms can be obtained by addition of brominated and/or iodinated "cure-site" comonomers, such as bromo and/or iodo olefins having from 2 to 10 carbon atoms, as described for example in U.S. Pat. No. 4,035,565 and U.S. Pat. No. 4,694,045, or of iodo and/or bromo fluoroalkylvinylethers, as described in U.S. Pat. No. 4,745,165, U.S. Pat. No. 4,564,662 and EP 199,138, in such amounts that the cure-site comonomer content in the final compound is generally in the range 0.05–4 moles per 100 moles of the other basic monomeric units. Other usable iodinated compounds are the triiodinated ones derived from triazines as described in European patent application EP 860,436 and in European patent application 979,832.

In alternative or also in combination with the "cure-site" comonomers, it is possible to introduce in the fluoroelastomer iodine and/or bromine end atoms by addition to the reaction mixture of iodinated and/or brominated polymer chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. No. 4,243,770 and U.S. Pat. No. 4,943,622). It is also possible to use as polymer chain transfer agents iodides and/or bromides of alkaline or alkaline-earth metals, according to U.S. Pat. No. 5,173,553.

In combination with the polymer chain transfer agents containing iodine and/or bromine, other polymer chain transfer agents known in the prior art, such as ethyl acetate, diethylmalonate, etc., can be used.

Curing by peroxidic route is carried out, according to known techniques, by addition of a suitable peroxide capable to generate radicals by thermal decomposition. Among the most commonly used we remember: dialkyl peroxides, such as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy)butyl]carbonate. Other peroxidic systems are described, for example, in European patent applications EP 136,596 and EP 410,351.

To the curing blend other compounds are then added, such as:

(a) curing coagents, in amounts generally in the range 0.5–10%, preferably 1–7% by weight with respect to the polymer; among them there are usually used: triallyl-cyanurate; triallyl-isocyanurate (TAIC); tris (diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane, etc.; TAIC is particularly preferred; other preferred crosslinking agents are the bis-olefins described in EP 769,520.

Other crosslinking agents which can be used are triazines described in European patent application EP 860,436 and in European patent application WO97/05122;

(b) optionally a metal compound, in amounts in the range 1–15%, preferably 2–10%, by weight with respect to the polymer, selected from oxides or hydrooxides of divalent metals, such as for example Mg, Zn, Ca or Pb, optionally combined with a weak acid salt, such as for example stearates, benzoates, carbonates, oxalates or phosphites of Ba, Na, K, Pb, Ca;

(c) optionally acid acceptors of the non metal oxide type such as 1,8 bis dimethyl amino naphthalene, octadecylamine, etc. as described in EP 708,797.

(d) other conventional additives, such as thickening fillers, pigments, antioxidants, stabilizers and the like.

Curing by ionic route, preferred curing route according to the present invention, is carried out by addition of curing and accelerating agents well known in the prior art. The amounts of the accelerating agents are in the range 0.05–5 phr, the curing agent in the range 0.5–15 phr, preferably 1–6 phr.

As curing agents, aromatic or aliphatic polyhydroxylated compounds or their derivatives can be used, as described for example in EP 335,705 and U.S. Pat. No. 4,233,427. Among them we remember in particular: di-, tri- and tetra-hydroxy benzenes, naphthalenes or anthracenes; bisphenols, wherein the two aromatic rings are linked each other by an aliphatic, cycloaliphatic or aromatic bivalent radical, or by one oxygen or sulphur atom, or also by a carbonyl group. Aromatic rings can be substituted by one or more chlorine, fluorine, bromine atoms or by carbonyls, alkyls, acyls. In particular bisphenol AF is preferred.

As accelerating agents it can be used for example: quaternary ammonium or phosphonium salts (see for example EP 335,705 and U.S. Pat. No. 3,876,654); aminophosphonium salts (see for example U.S. Pat. No. 4,259,463); phosphoranes (see for example U.S. Pat. No. 3,752,787); iminic compounds described in EP 182,299 and EP 120,462; etc. Quaternary phosphonium salts and aminophosphonium salts are preferred.

Instead of using the accelerating agent and the curing agent separately, it can also be used from 1 to 5 phr (preferred from 2 to 4.5) of an adduct between an accelerating agent and a curing agent in molar ratio from 1:2 to 1:5, preferably from 1:3 to 1:5, the accelerating agent being one of the onium-organic compounds having a positive charge, as above defined, the curing agent being selected from the above compounds, in particular di- or polyhydroxy or di- or polythiol compounds; the adduct being obtained by melting the reaction compound between the accelerating and the curing agent in the mentioned molar ratios, or by melting the mixture of the adduct 1:1 added with the curing agent in the indicated amounts. Optionally also an excess of the accelerating agent with respect to that contained in the adduct can be present, generally in amounts from 0.05 to 0.5 phr.

For the preparation of the adduct, particularly preferred as cations are: 1,1-diphenyl-1-benzyl-N-diethyl-phosphoranamine and tetrabutyl phosphonium; among the anions, bisphenol compounds are particularly preferred, wherein the two aromatic rings are linked by a bivalent radical selected from the perfluoroalkyl groups having from 3 to 7 carbon atoms, and the OH are in para position.

The adduct preparation is described in the European patent application in the name of the Applicant EP 684,277 herein incorporated by reference.

The curable blend furthermore contains:
i) one or more inorganic acid acceptors selected from those known in ionic curing of vinylidene fluoride copolymers, in amounts 1–40 parts for 100 parts of fluoroelastomeric copolymer;
ii) one or more basic compounds selected from those known in the ionic curing of vinylidene fluoride copolymers in amounts from 0.5 to 10 parts per 100 parts of fluoroelastomeric copolymer.

The basic compounds ii) are commonly selected from the group formed by Ca(OH)$_2$, Sr(OH)$_2$, Ba(OH)$_2$, metal salts of weak acids, such as for example carbonates, benzoates, oxalates and phosphites of Ca, Sr, Ba, Na and K and mixtures of the aforesaid hydroxides with the aforesaid metal salts; among the compounds of the type i), MgO can be mentioned.

The indicated amounts of the blend components are referred to 100 phr of copolymer or terpolymer of the invention. To the curing blend other conventional additives, such as thickeners, pigments, antioxidants, stabilizers and the like can then be added.

The results of the present invention are quite unexpected since there was no mention in the prior art that it was possible to disperse amounts of semi-crystalline fluoropolymer higher than 40% by weight, such to obtain a very good disperdibility of the fluoropolymer in the fluoroelastomer without formation of fluoropolymer aggregates.

As said, the fluoroelastomeric compositions of the invention have the following combination of properties:
improved mechanical properties, in particular improved elastic modulus/elongation at break ratio;
elongation at break higher than 200%;
high hardness, homogeneous on the whole manufactured article;
improved chemical and thermal resistance;
excellent surface aspect, roughnesses free;
working easiness in equipments conventionally used in the fluoroelastomer field, without using complicated technologies for the incorporation;
lower permeability to fluids, in particular to hydrocarbons.

Therefore the compositions of the invention are particularly suitable for oil drilling applications in the oil industry.

The present invention will be better illustrated by the following Examples, which have a merely indicative and not limitative purpose of the scope of the invention itself.

EXAMPLES

Example 1

Preparation of the Invention Composition Containing 50% of Semi-crystalline Fluoropolymer B)

a) Preparation of the Semi-crystalline Fluoropolymer B) Latex

In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:

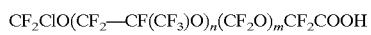

wherein n/m=10, having average molecular weight of 600;

56.4 ml of an aqueous solution of NH$_4$OH at 30% by volume;

112.8 ml of demineralized water;

34.4 ml of Galden® D02 having the formula:

wherein n/m=20, having average molecular weight of 450.

The autoclave was then heated up to 80° C. and maintained at this temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

During the reaction the pressure is maintained at 20 bar by continuously feeding the following monomeric mixture: 2% by moles of PMVE and 98% of TFE.

After 45 minutes of reaction, corresponding to 100% of the monomer conversion, the autoclave was cooled and the latex discharged. The latex properties are reported in Table 1.

b) Preparation of the Fluoroelastomer A) Latex

In a 10 l autoclave, equipped with stirrer working at 545 rpm, there were introduced, after evacuation, 6.5 l of demineralized water and 67 ml of a microemulsion of perfluoropolyoxyalkylenes previously obtained by mixing:

14.5 ml of a perfluoropolyoxyalkylene having an acid end group of formula:

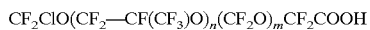

$CF_2ClO(CF_2-CF(CF_3)O)_n(CF_2O)_mCF_2COOH$ wherein n/m=10, having average molecular weight of 600;

14.5 ml of an aqueous solution of $NH_4OH$ at 30% by volume;

29 ml of demineralized water;

9 ml of Galden® D02 having the formula:

$CF_3O(CF_2-CF(CF_3)O)_n(CF_2O)_mCF_3$ wherein n/m=20, having average molecular weight of 450.

The autoclave was then heated up to 80° C. and maintained at said temperature for the whole reaction. The following mixture of monomers was then fed:

| vinylidene fluoride (VDF) | 48% by moles |
| hexafluoropropene (HFP) | 45% by moles |
| tetrafluoroethylene (TFE) | 7% " | so as to bring the pressure up to 30 bar (3 MPa).

In the autoclave there were then introduced:

0.32 g of ammonium persulphate (APS) as initiator;

21 g of 1,6-diiodoperfluorobutane ($C_4F_8I_2$) as polymer chain transfer agent; the addition was carried out in 3 aliquots, the first one equal to 3.2 g at the beginning of the polymerization, the second one equal to 9.4 g at 20% of conversion, the third one equal to 8.4 g at 80% of conversion;

10 g of bis-olefin of formula $CH_2=CH-(CF_2)_6-CH=CH_2$; the addition was carried out in 20 aliquots, each of 0.5 g starting from the beginning of the polymerization and for every 5% increase in the monomer conversion.

The 30 bar pressure was maintained constant for the whole polymerization by feeding a mixture formed by:

| vinylidene fluoride (VDF) | 70% by moles |
| hexafluoropropene (HFP) | 19% by moles |
| tetrafluoroethylene (TFE) | 11% " |

After 160 minutes of reaction, corresponding to 100% of the monomer conversion, the autoclave was cooled and the latex discharged. The latex properties are reported in Table 1.

c) Mixing of the Latexes and Preparation of the Invention Composition

The latex obtained in a) was mixed with the latex prepared in b) so as to obtain an amount of semi-crystalline polymer equal to 50% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours. 1,000 g of the invention composition were obtained, which was characterized, see Table 2.

The mixing of the composition of Example 1 with the crosslinking agents was carried out in an open mixer commonly used to mix fluoroelastomers. The plates obtained by moulding of the composition of Example 1 show a very smooth surface, roughnesses free.

Example 2 (Comparative)

Preparation of the Invention Composition Containing 20% of Semi-crystalline Fluoropolymer B)

a) Preparation of the semi-crystalline fluoropolymer B) latex

Example 1 is repeated.

b) Preparation of the fluoroelastomer A) latex

The procedure of Example 1 is repeated.

c) Mixing of the latexes and preparation of the invention composition

The latex obtained in a) was mixed with the latex prepared in b) so as to obtain an amount of semi-crystalline polymer equal to 20% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours.

1,000 g of polymer are obtained.

The latex properties are reported in Table 1. The characterization of the invention composition is reported in Table 2.

Example 3 (Comparative)

Preparation of a Composition Containing 50% of Fluoropolymer in Powder a) Preparation of the semi-crystalline fluoropolymer B) latex Example 1 is repeated and the obtained latex is coagulated.

b) Preparation of the fluoroelastomer A) latex

The procedure of Example 1 is repeated and the obtained latex is coagulated.

c) Mixing of the polymers and preparation of the final composition in an open mixer It was not possible to mix the two polymers A) and B) in an open mixer under the conditions used in Example 1, wherefore it was not possible to determine the final properties of the composition of this Example.

Example 4 (Comparative)

Preparation of a Composition for the Oil Drilling Containing Mineral Fillers

Mixing of the agents and preparation of the final composition: as fluoroelastomer A) Tecnoflon® P757 is used. The semi-crystalline fluoropolymer B) is on the contrary not used. The compound properties are reported in Table 2.

TABLE 1

| Examples | solid/latex (g/l) | Particle diameter (nm) | MFI[1] ASTM D1238 | Mooney $(1 + 10)^{121° C.}$ ASTM D1646 |
|---|---|---|---|---|
| 1 | | | | |
| Fluoroel.A | 360 | 70 | — | 52 |
| Polymer B | 200 | 30 | 10 | — |
| 2 comp. | | | | |
| Fluoroel.A | 360 | 70 | — | 52 |
| Polymer B | 200 | 30 | 10 | — |
| 3 comp. | | | | |
| Fluoroel.A | 360 | 70 | — | 52 |
| Polymer B | 200 | 30 | 10 | — |

[1]MFI was measured at 372° C. with 2.16 Kg

TABLE 2

| | | EXAMPLES | | | |
|---|---|---|---|---|---|
| | | 1 | 2 comp | 3 comp | 4 comp |
| % by weight polymer B) in A) + B) | | 50 | 20 | 50** | — |
| Formulation: | | | | | |
| Comp. A) + B) | phr | 100 | 100 | 100 | — |
| Tecnoflon ® P757 | " | — | — | — | 100 |
| Drimix TAIC | " | 3 | 3 | 3 | 5 |
| Luperco 101 XL | " | 2 | 2 | 2 | 5 |
| CELITE 499 | " | 5 | 5 | 5 | — |
| Carbon Black | " | 1 | 1 | 1 | 30 |
| Carbon Black SRF | " | — | — | — | 30 |
| ZnO | " | — | — | — | 5 |
| MDR (177° C., 12') (ASTM D6204-97): | | | | | |
| ML | Lbf.in. | 12 | 4.5 | | n.d. |
| MH | " | 41 | 25.5 | | n.d. |
| Ts2 | sec | 15 | 21 | | n.d. |
| T'90 | " | 63 | 70 | | n.d. |
| Mechanical properties after post-cure at 230° C. for 1 + 4 h (ASTM D412–83) | | | | | |
| M100 | Mpa | 6.2 | 4 | | 20 |
| Stress at break | " | 15 | 13 | | 18 |
| Elong. at break | % | 312 | 412 | | 110 |
| Shore A hardness | | 86 | 64 | | 88 |

**it was not possible to mix the compounds A) and B) in powder in an open mixer wherefore the subsequent characterization, as for the other Examples, was not carried out

What is claimed is:

1. Fluoroelastomeric compositions comprising:
   A) a perfluoroelastomeric matrix;
   B) a semi-crystalline fluoropolymer, in an amount from higher than 40% to 90% by weight based on the total of A)+B);
the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, in an amount from 0.01 to 10% by moles, the average sizes of the semi-crystalline fluoropolymer particles being from 10 to 100 nm.

2. Fluoroelastomeric compositions according to claim 1, wherein the semi-crystalline fluoropolymer B) amount incorporated, in the fluoroelastomeric matrix is higher than 40% by weight, based on the total of the polymer mixture.

3. Compositions according to claim 1, wherein the semi-crystalline fluoropolymer B) comprises comonomers having an ethylene unsaturation both of hydrogenated and fluorinated type.

4. Compositions according to claim 3, wherein the fluorinated comonomers are selected from the following:
   $C_3$–$C_8$ perfluoroolefins;
   $C_2$–$C_8$ hydrogenated fluoroolefins;
   $C_2$–$C_8$ chloro-fluorolefins
   (per)fluoroalkylvinylethers (PAVE) $CF_2$=$CFOR_f$, wherein $R_f$ is a $C_1$–$C_6$ (per)fluoroalkyl;
   (per)fluoro-oxyalkylvinylethers $CF_2$=$CFOX$, wherein X is: $C_1$–$C_{12}$ alkyl, or $C_1$–$C_{12}$ oxyalkyl, or $C_1$–$C_{12}$ (per)fluoro-oxyalkyl having one or more ether groups;
   fluorovinylethers (MOVE) of general formula $CFX_{AI}$=$CX_{AI}OCF_2OR_{AI}$ (A–I) wherein $R_{AI}$ is a $C_2$–$C_6$ linear, branched, or $C_5$–$C_6$ cyclic (per)fluoroalkyl group, or a $C_2$–$C_6$ linear, branched (per) fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H.

5. Compositions according to claim 4, wherein the comonomers are selected among PAVES, MOVEs, and fluorodioxoles.

6. Compositions according to claim 1, wherein the fluoroelastomers A) are VDF- or TFE-based copolymers and are selected from the following:
   (1) VDF-based copolymers, wherein VDF is copolymerized with at least one comonomer selected from the following:
   $C_2$–$C_8$ perfluroolefins;
   $C_2$–$C_8$ chloro- and/or bromo- and/or iodo-fluoroolefins;
   (per)fluoroalkylvinylethers (PAVE) $CF_2$=$CFOR_f$, wherein $R_f$ is a $C_1$–$C_6$ (per)fluoroalkyl;
   perfluoro-oxyalkylvinylethers $CF_3$=$CFOX$, wherein X is a $C_1$–$C_{12}$ perfluorooxyalkyl, having one or more ether groups;
   fluorovinylethers (MOVE) of general formula $CFX_{AI}$=$CX_{AI}OCF_2OR_{AI}$ (A–I) wherein $R_{AI}$ is a $C_2$–$C_6$ linear, branched or $C_5$–$C_6$ cyclic (per)fluoroalkyl group, or a $C_2$–$C_6$ linear, branched (per) fluorooxyalkyl group containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}$=F, H;
   $C_2$–$C_8$ non fluorinated olefins (Ol);
   (2) TFE-based copolymers, wherein TFE is copolymerized with at least one comonomer selected from the following:
   (per)fluoroalkylvinylethers (PAVE) $CF_2$=$CFOR_f$, wherein $R_f$ is as above;
   perfluoro-oxyalkylvinylethers $CF_2$=$CFOX$, wherein X is as above;
   fluorovinylethers (MOVE) of formula $CFX_{AI}$=$CX_{AI}OCF_2OR_{AI}$ (A–I) wherein $R_{AI}$ and $X_{AI}$ are as above;
   $C_2$–$C_8$ fluoroolefins containing hydrogen and/or chlorine and/or bromine and/or iodine atoms;
   $C_2$–$C_8$ non fluorinated olefins (Ol);
   perfluorovinylethers containing hydrocyanic groups.

7. Fluoroelastomeric compositions according to claim 6, wherein the monomer compositions, expressed as % by moles, which form the basic structure of the fluoroelastomer, are the following, being 100% the sum of the molar percentages of the monomers:
   (a) vinylidene fluoride (VDF) 45–85%, hexafluoropropene (HFP) 15–45%, tetrafluoroethylene (TFE) 0–30%; $C_2$–$C_8$ non fluorinated olefins (Ol) 0–30%;
   (b) vinylidene fluoride (VDF) 45–85%, perfluoroalkyl vinyl ether (PAVE) and/or fluorovinyl-ethers (MOVE) 15–55%, tetrafluoroethylene (TFE) 0–30%;
   (c) vinylidene fluoride (VDF) 15–40%, $C_2$–$C_8$ non fluorinated olefins (Ol) 5–30%, hexafluoropropene (HFP) and/or perfluoroalkylvinylether (PAVE) 15–30%, tetrafluoroethylene (TFE) 1–30%;
   (d) vinylidene fluoride (VDF) 5–30%, perfluoroalkylvinylether (PAVE) and/or fluorovinylethers (MOVE) 15–55%, tetrafluoroethylene (TFE) 33–75%;
   (e) tetrafluoroethylene (TFE) 50–80%, perfluoroalkylvinylether (PAVE) and/or fluorovinylethers (MOVE) 15–55%;

(f) tetrafluoroethylene (TFE) 45–65%, $C_2$–$C_8$ non fluorinated olefins (Ol) 20–55%, vinylidene fluoride 0–30%;

(g) tetrafluoroethylene (TFE) 32–60% by moles, $C_2$–$C_8$ non fluorinated olefins (Ol) 10–40%, perfluoroatkylvinylether (PAVE) 20–40%.

8. Compositions according to claim 1, wherein the fluoroelastomeric matrix comprises monomeric units deriving from a bis-olefin having general formula:

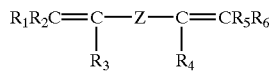 (II)

wherein
$R_1$, $R_2$, $R_3$, $R_4$, $R_5$, $R_6$, equal to or different from each other, are H or $C_1$–$C_5$ alkyls;
Z is a $C_1$–$C_{18}$ linear or branched alkylene or cycloalkylene radical, optionally containing oxygen atoms, or a (per)fluoropolyoxyalkylene radical, the amount of the units in the polymer chain deriving from said bis-olefins being in the range 0.01–1.0% by moles, per 100 moles based on the total of the other monomeric units.

9. Fluoroelastomeric compositions according to claim 1, obtained by mixing the latex of the semi-crystalline fluoropolymer B) with the latex of the fluoroelastomer A) and subsequent coagulation.

10. Fluoroelastomeric compositions according to claim 1, obtained in the same reactor, by using two subsequent steps: in the first step the semi-crystalline fluoro-polymer B) is polymerized, while in the second step the fluoro-elastomer A) is polymerized.

11. Compositions according to claim 1, cured by peroxidic or by ionic route or by combination of the two techniques.

12. Compositions according to claim 4, wherein the fluorinated comonomers are selected from the following:
hexafluaropropene (HFP) or hexafluoroisobutene;
vinyl fluoride (VF), vinylidene fluoride (VDF), trifluoroethylene or perfluoroalkylethylene $CH_2$=CH—$R_f$, wherein $R_f$ is a $C_1$–$C_6$ perfluoroalkyl;
chlorotrifluoroethylene (CTFE);
(per)fluoroalkylvinylethers (PAVE) $CF_2$=$CFOR_f$, wherein $R_f$ is $CF_3$, $C_2F_5$, $C_3F_7$;
(per)fluoro-oxyalkylvinylethers $CF_2$=CFOX, wherein X is: $C_1$–$C_{12}$ alkyl, $C_1$–$C_{12}$ alkyl, $C_1$–$C_{12}$ oxyalkyl, $C_1$–$C_{12}$ (per)fluoro-oxyalkyl having one or more perfluoro-2-propoxy-propyl groups or perfluoxodioxoles;

fluorovinylethers (MOVE) of general formula

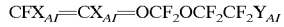 (A–II)

wherein $Y_{AI}$ is F or $OCF_3$, $X_{AI}$ as above defined; or (MOVE I) $CF_2$=$CFOCF_2OCF_2CF_3$ (A–III) and (MOVE II) $CF_2$=$CFOCF_2OCF_2CF_2OCF_3$ (A–IV).

13. Compositions according to claim 5, wherein the comonomers are selected from the group consisting of perfluoromethyl-, ethyl-, propyl-vinylether, MOVE I and MOVE II, and perfluoro-dioxoles.

14. Compositions according to claim 6, wherein the VDF-based copolymers comprise at least one comonomer selected from the group consisting of tetrafluoroethylene (TFE); hexafluoropropene (HFP); chlorotrifluoroethylene (CTFE); bromotrifluoroethylene; (per)fluoroalkylvinylethers (PAVE) $CF_2$=CFOX, wherein $R_f$ is trifluoromethyl, bromodifluoromethyl or pentafluoropropyl, perfluoro-oxyalkylvinylethers $CF_2$=CFOX, wherein X is a perfluoro-2-propoxy-propyl group; fluorovinylethers (MOVE) of formula $CFX_{AI}$=$CX_{AI}OCF_2OR_{AI}$ (A–I)

wherein $R_{AI}$ is as above defined, $X_{AI}$ is F or H, or of formula: $X_{AI}$ is F or H, or of formula $CFX_{AI}$=$CX_{AI}OCF_2OCF_2CF_2Y_{AI}$ (A–II) wherein $Y_{AI}$=F, $OCF_3$; $X_{AI}$, as above defined, or (MOVE I) $CF_2$=$CFOCF_2OCF_2CF_3$ (A–III) and (MOVE II) $CF_2$=$CFOCF_2OCF_2CF_2OCF_3$ (A–IV).

15. Compositions according to claim 8, wherein the fluoroelastomeric matrix comprises the monomeric units deriving from a bis-olefin of formula (II) wherein Z is a partially fluorinated $C_1$–$C_{18}$ linear or branched alkylene or cycloalkylene radical, optionally containing oxygen atoms, or a (per)fluoropolyoxyalkylene radical.

16. Sealing manufactured articles obtained by the compositions according to claims 1–11.

17. Sealing manufactured articles according to claim 16, wherein said articles are gaskets, pipes, fittings, shaft seals and oil seal rings.

18. Sealing manufactured articles according to claims 16–17 for oil industry.

* * * * *

UNITED STATES PATENT AND TRADEMARK OFFICE
CERTIFICATE OF CORRECTION

PATENT NO.    : 6,844,036 B2
DATED         : January 18, 2005
INVENTOR(S)   : Marco Apostolo et al.

It is certified that error appears in the above-identified patent and that said Letters Patent is hereby corrected as shown below:

Column 12,
Line 19, delete "$CF_3=CFOX$" and substitute therefor -- $CF_2=CFOX$ --;
Line 61, delete "(TFE) 1-30%" and substitute therefor -- (TFE) 10-30% --.

Signed and Sealed this

Twenty-fourth Day of May, 2005

JON W. DUDAS
*Director of the United States Patent and Trademark Office*